(12) United States Patent
Kamiyama et al.

(10) Patent No.: US 9,032,401 B2
(45) Date of Patent: May 12, 2015

(54) VIRTUAL COMPUTER SYSTEM HAVING A FIRST VIRTUAL COMPUTER THAT EXECUTES A PROTECTED PROCESS, A SECOND VIRTUAL COMPUTER THAT EXECUTES AN UNPROTECTED PROCESS, AND A HYPERVISOR THAT CONTROLS THE FIRST AND SECOND VIRTUAL COMPUTERS

(75) Inventors: Teruo Kamiyama, Osaka (JP); Katsushige Amano, Kyoto (JP); Masahiko Saito, Osaka (JP); Tadao Tanikawa, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 232 days.

(21) Appl. No.: 13/810,024

(22) PCT Filed: Mar. 30, 2012

(86) PCT No.: PCT/JP2012/002229
§ 371 (c)(1),
(2), (4) Date: Jan. 14, 2013

(87) PCT Pub. No.: WO2012/157166
PCT Pub. Date: Nov. 22, 2012

(65) Prior Publication Data
US 2013/0117745 A1  May 9, 2013

(30) Foreign Application Priority Data
May 16, 2011  (JP) .................................. 2011-109028

(51) Int. Cl.
*G06F 9/455*  (2006.01)
*G06F 12/14*  (2006.01)
*G06F 21/10*  (2013.01)

(52) U.S. Cl.
CPC ........ *G06F 9/45558* (2013.01); *G06F 12/1466* (2013.01); *G06F 2009/45587* (2013.01); *G06F 21/10* (2013.01)

(58) Field of Classification Search
CPC .............. G06F 9/45533; G06F 9/5077; G06F 9/45537; G06F 9/45558; G06F 12/1466; G06F 21/10; G06F 2009/45587
See application file for complete search history.

(56) References Cited

U.S. PATENT DOCUMENTS 7,389,512 B2   6/2008  Tucker
8,156,298 B1 *  4/2012  Stubblefield .................. 711/163
(Continued)

FOREIGN PATENT DOCUMENTS

JP   11-85546     3/1999
JP   2003-345654  12/2003
(Continued)

OTHER PUBLICATIONS

International Search Report issued Jun. 5, 2012 in International (PCT) Application No. PCT/JP2012/002229.

*Primary Examiner* — Van Nguyen
(74) *Attorney, Agent, or Firm* — Wenderoth, Lind & Ponack, L.L.P.

(57) ABSTRACT

When a process judging unit judges that a target process is a protected process, a key judging unit judges whether a target key that is a key generated by a key generating unit is a first key or a second key. When the key judging unit judges that the target key is the first key, a VM communication managing unit notifies the target process of a memory ID of a protected memory region corresponding to the first key. When the process judging unit judges that the target process is an unprotected process, a key transforming unit transforms the target key from the first key to the second key based on the key transformation rule. An HV communication managing unit notifies the target process of a memory ID of an unprotected memory region corresponding to the second key.

12 Claims, 9 Drawing Sheets

(56) References Cited

U.S. PATENT DOCUMENTS

| | | | |
|---|---|---|---|
| 8,374,842 B2 * | 2/2013 | Amano et al. | 703/23 |
| 8,489,862 B2 * | 7/2013 | Saito et al. | 712/43 |
| 8,719,834 B2 * | 5/2014 | Amano | 718/105 |
| 8,738,932 B2 * | 5/2014 | Lee et al. | 713/190 |
| 8,839,239 B2 * | 9/2014 | Raj et al. | 718/1 |
| 2003/0221115 A1 | 11/2003 | Itoh et al. | |
| 2004/0226023 A1 | 11/2004 | Tucker | |
| 2009/0055840 A1 | 2/2009 | Hieda | |

FOREIGN PATENT DOCUMENTS

| | | |
|---|---|---|
| JP | 2004-334893 | 11/2004 |
| JP | 2010-211339 | 9/2010 |
| JP | 2011-70526 | 4/2011 |
| WO | 2006/101194 | 9/2006 |

* cited by examiner

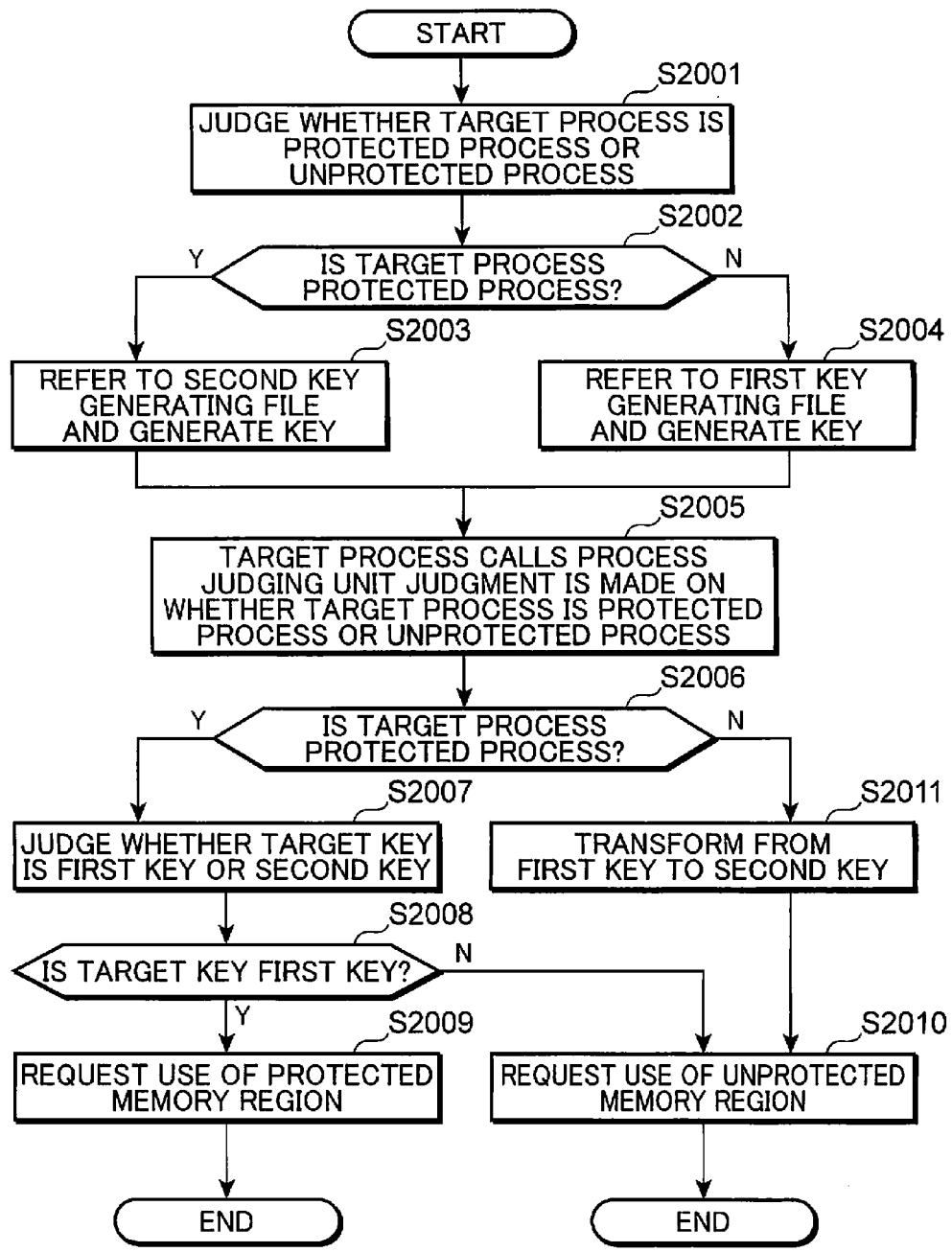

| KEY (5001) | SHARED MEMORY ADDRESS (5002) | MEMORY ID (5003) |
|---|---|---|
| 38 | 0x20004000 | 3313 |
| 21 | 0x20008000 | 4243 |
| 57 | 0x20016000 | 7459 |

| KEY (5001) | SHARED MEMORY ADDRESS (5002) | MEMORY ID (5003) |
|---|---|---|
| 1038 | 0x80004000 | 3891 |
| 1021 | 0x80008000 | 2998 |
| 1057 | 0x80012000 | 9701 |

FIG.7

| VMID | STATE |
|---|---|
| VM_P | ISSUED |
| VM_C1 | STAND-BY |
| VM_C2 | STAND-BY |
| ... | ... |

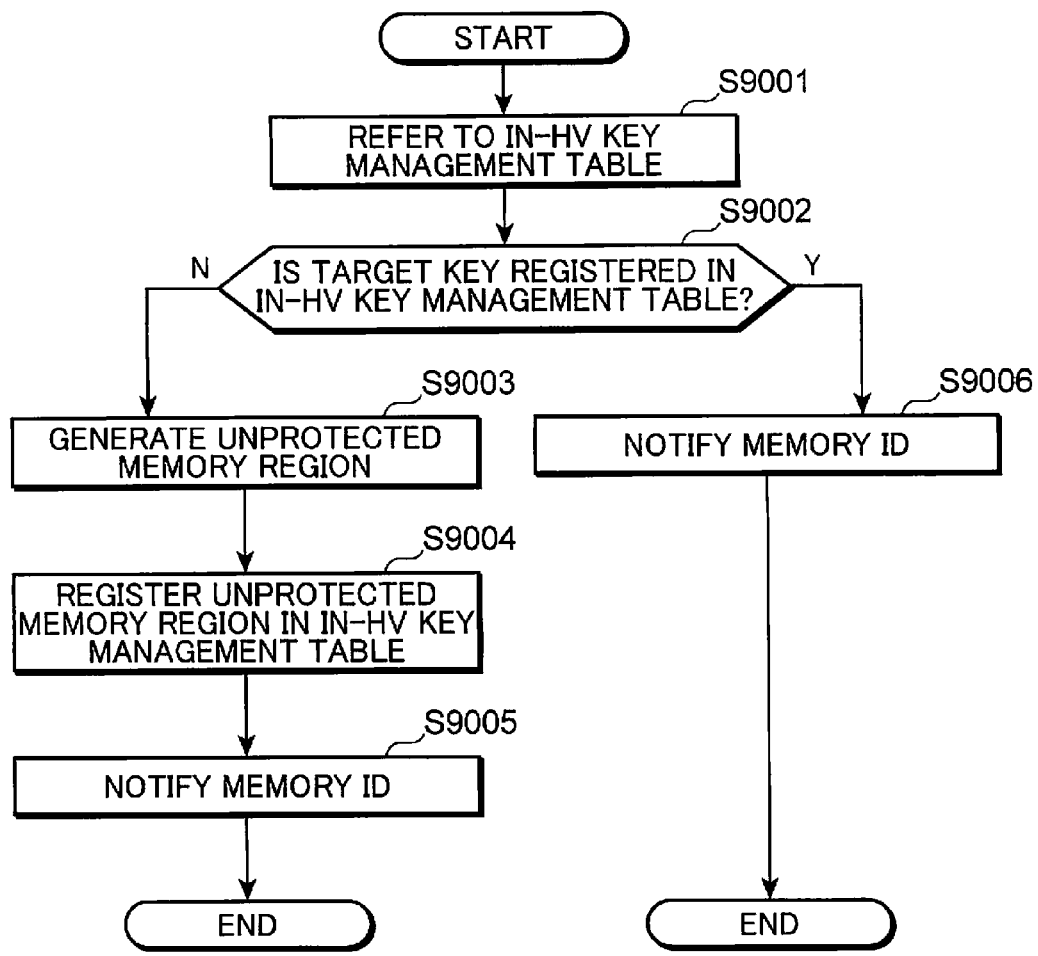

VIRTUAL COMPUTER SYSTEM HAVING A FIRST VIRTUAL COMPUTER THAT EXECUTES A PROTECTED PROCESS, A SECOND VIRTUAL COMPUTER THAT EXECUTES AN UNPROTECTED PROCESS, AND A HYPERVISOR THAT CONTROLS THE FIRST AND SECOND VIRTUAL COMPUTERS

TECHNICAL FIELD

The present invention relates to a virtual computer system having a plurality of virtual computers and a hypervisor that controls the virtual computers.

BACKGROUND ART

Some information-processing devices are provided with applications for handling private information, information on services involving money, copyrighted material, and the like. Such applications must be protected from accesses by other applications with malicious intent and from attacks by a computer virus or the like.

One means of protecting an application is to apply virtual computer technology. In an environment using virtual computers, a plurality of virtual computers run on one physical computer. In this case, a specific application to be quarantined is processed by a virtual computer that differs from a virtual computer that handles general processing. Accordingly, a malicious application that is desirably quarantined can be prevented from affecting other applications on a virtual computer level.

Known examples of conventional art related to the present invention include Patent Documents 1 and 2 described below. Patent Document 1 discloses a technique in which a hypervisor that controls virtual computers is provided with key management information of a shared memory to realize communication between virtual computers.

Patent Document 2 discloses a technique for controlling communication between virtual computers in order to solve the issue of security in communication between virtual computers, in which a communication permission table for setting whether to permit or deny communication between virtual computers is provided in a hypervisor, a receiving application sets a transmitting application from which transmission is to be permitted in the communication permission table, and a transmitting application references the communication permission table.

However, with the technique disclosed in Patent Document 1, once the key is known, a shared memory for interprocess communication within a virtual computer can now be accessed by another virtual computer as a shared memory for interprocess communication between virtual computers. Therefore, there is an issue regarding security.

In addition, with the technique disclosed in Patent Document 2, there is a problem in that if the receiving application that sets the communication permission table is infected by a virus, the transmitting application from which transmission is to be permitted also becomes infected by the virus.

Patent Document 1: Japanese Patent Application Laid-open No. H11-85546
Patent Document 2: Japanese Patent Application Laid-open No. 2010-211339

SUMMARY OF THE INVENTION

An object of the present invention is to provide a technique that enables communication between virtual computers to be safely performed when executing an unprotected process on a virtual computer that differs from a virtual computer on which a protected process is executed.

A virtual computer system according to an aspect of the present invention is a virtual computer system having a first virtual computer that executes a protected process, a second virtual computer that executes an unprotected process, and a hypervisor that controls the first and second virtual computers, wherein the first and second virtual computers have: a key generating unit which generates a second key that has been transformed from a first key according to a predetermined key transformation rule when a communication request is issued by the protected process that communicates with the unprotected process and which generates the first key when a communication request is issued by another process; a process judging unit which judges whether a target process that is a process having issued the communication request is the protected process or the unprotected process; a key judging unit which judges whether a target key that is a key generated by the key generating unit is the first key or the second key when the process judging unit judges that the target process is the protected process; and a VM communication managing unit which notifies the target process of a memory ID of a protected memory region corresponding to the first key when the key judging unit judges that the target key is the first key, the hypervisor comprises: an HV communication managing unit which notifies the target process of a memory ID of an unprotected memory region corresponding to the second key when the key judging unit judges that the target key is the second key, the first and second virtual computers further comprise: a key transforming unit which transforms the target key from the first key to the second key based on the key transformation rule when the process judging unit judges that the target process is the unprotected process, and the HV communication managing unit notifies the target process of a memory ID of the unprotected memory region corresponding to the second key transformed by the key transforming unit.

BRIEF DESCRIPTION OF THE DRAWINGS

FIG. 2 is a flow chart showing operations of a virtual computer system according to an embodiment of the present invention.

FIG. 5A is a diagram showing an example of an in-VM key management table, and FIG. 5B is a diagram showing an example of an in-HV key management table.

FIG. 7 is a diagram showing an example of VM management information.

FIG. 9 is a flow chart showing processing when a use request for an unprotected memory region is notified to an HV communication managing unit in an embodiment of the present invention.

MODE FOR CARRYING OUT THE INVENTION

Figure 1:
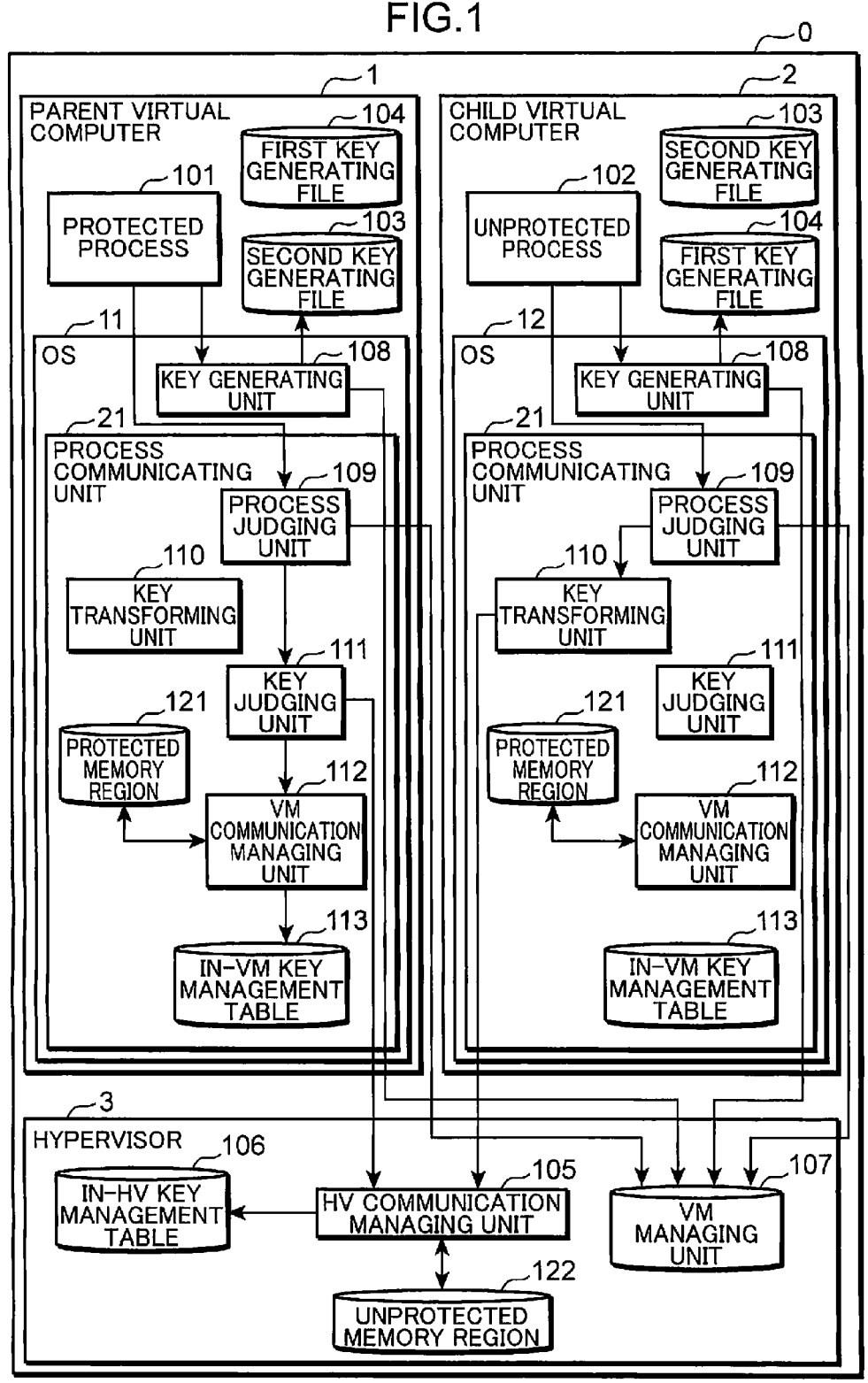
FIG. 1 is a functional block diagram of a virtual computer system according to an embodiment.

Circumstances Leading to an Embodiment of the Present Invention

As described earlier in Background Art, applications for handling private information, information on services involving money, copyrighted material, and the like must be protected from accesses by other applications with malicious intent and from attacks by a computer virus or the like. Also described in Background Art was that, as a solution to this issue, a specific application to be quarantined is processed by a virtual computer that differs from a virtual computer for handling general processing.

Meanwhile, as a technique for newly generating a virtual computer, dynamic generation of a new virtual computer by duplicating a running virtual computer has been proposed. Duplicating a virtual computer to dynamically generate a new virtual computer in this manner is referred to as a "virtual computer fork". In addition, the duplicate source virtual computer is referred to as a "parent virtual computer", and the duplicated virtual computer is referred to as a "child virtual computer".

When activating an application to be quarantined, a virtual computer fork is executed to generate a child virtual computer and the application is executed and processed on the child virtual computer. Accordingly, a protection target application is protected from malicious attacks by the quarantined application.

The protection target application can also be protected from an unsafe application by conversely executing the unsafe application on the parent virtual computer and executing the application to be protected on the child virtual computer. Once processing of the application on the child virtual computer is complete, the child virtual computer is destroyed and the quarantined application is also destroyed.

When a process of an application quarantined on a child virtual computer and a process of an application executed on a parent virtual computer that is the duplicate source communicate with each other due to a virtual computer fork, interprocess communication is performed between virtual computers.

A known example of general interprocess communication uses a shared memory. In this communication, data is exchanged by having a process generate a shared memory and having another process use the shared memory or, in other words, by having processes share a shared memory. A key is required when generating a shared memory. The shared memory is identified by the key. Communicating processes are able to share a same shared memory and communicate with each other by presenting a same key.

As conventional communication between virtual computers using a shared memory, a technique is known in which a hypervisor that controls virtual computers is provided with key management information of the shared memory to realize communication between the virtual computers (Patent Document 1). According to Patent Document 1, communication between virtual computers is realized by having a hypervisor assume key management of the shared memory which had conventionally been handled by an operating system.

In addition, as a method of solving the issue of security in communication between virtual computers, a technique for controlling communication between virtual computers is known in which a communication permission table for setting whether to permit or deny communication between virtual computers is provided in a hypervisor, a receiving application sets a transmitting application from which transmission is to be permitted in the communication permission table, and a transmitting application references the communication permission table (Patent Document 2).

However, with the technique disclosed in Patent Document 1, no distinction is made between a shared memory used in interprocess communication between virtual computers and a shared memory used in interprocess communication within a virtual computer. Therefore, once the identical key is available, a shared memory for interprocess communication within a virtual computer can be accessed by another virtual computer as a shared memory for interprocess communication between virtual computers. Consequently, with the method disclosed in Patent Document 1, there is a security issue in that even if an unsafe application is quarantined by a virtual computer fork, once a key of a shared memory used for interprocess communication within a virtual computer to be protected is known, the quarantined application is able to access the shared memory.

In addition, with the method disclosed in Patent Document 2, there is a problem in that if the receiving application that sets the communication permission table is infected by a virus, the transmitting application from which transmission is to be permitted also becomes infected by the virus.

Furthermore, conventional virtual computer forks only assume that communication is to be performed between processes within a virtual computer and do not assume communication performed between virtual computers. Therefore, when a virtual computer fork is applied to the method disclosed in Patent Document 2 and a downloaded application is quarantined from another virtual computer, there is a problem in that the downloaded application is unable to communicate with an application run on another virtual computer.

An object of a virtual computer system according to the present embodiment is to provide a technique that enables communication between virtual computers to be safely performed in a virtual computer system in which a virtual computer is duplicated to generate another virtual computer.

Hereinafter, an embodiment of the present invention will be described with reference to the drawings.

Embodiment

FIG. 1 is a functional block diagram of a virtual computer system 0 according to an embodiment. The virtual computer system 0 comprises a parent virtual computer 1, a child virtual computer 2, and a hypervisor 3. The child virtual computer 2 is generated by duplicating the parent virtual computer 1. Therefore, the child virtual computer 2 comprises all functions of the parent virtual computer 1 shown by the respectively blocks in FIG. 1. In the following description, it is assumed that the parent virtual computer 1 runs a protected process and the child virtual computer 2 runs an unprotected process. A protected process is a process that occurs when executing a protected application. An unprotected process is a process that occurs when executing an unprotected application.

The parent virtual computer 1 comprises a protected process 101, an operating system 11, a second key generating file 103, and a first key generating file 104. Moreover, although only one protected process 101 is shown in FIG. 1, a plurality of processes may be run depending on processing.

The protected process 101 is a process to be protected which handles private information, money information, copyrighted data, copyright management information, and the like, and is run within the parent virtual computer 1.

The operating system 11 generates a protected memory region 121 in a shared memory and manages the protected memory region 121. Here, a shared memory refers to a memory that is used when processes communicate with each other. In addition, the operating system 11 comprises a key generating unit 108 and a process communicating unit 21. The process communicating unit 21 comprises a process judging unit 109, a key transforming unit 110, a key judging unit 111, a VM communication managing unit 112, an in-VM key management table 113, and the protected memory region 121.

When a communication request is issued by a protected process wishing to communicate with an unprotected process, the key generating unit 108 generates a second key that has been transformed from a first key according to a predetermined key transformation rule, and when a communication request is issued by another process, the key generating unit 108 generates the first key. In this case, the key generating unit 108 generates keys by referencing key generating files in which keys are allocated to respective processes.

Figure 3A:
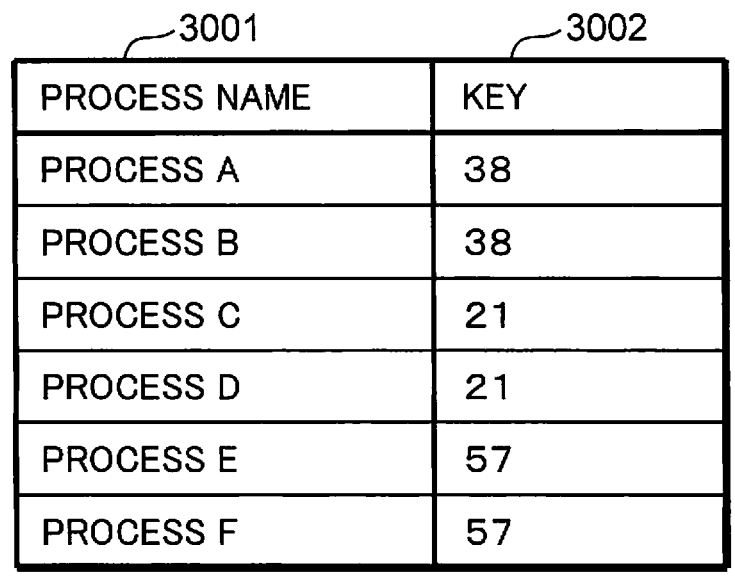
FIG. 3A is a diagram showing an example of a first key generating file according to an embodiment of the present invention.
Figure 3B:
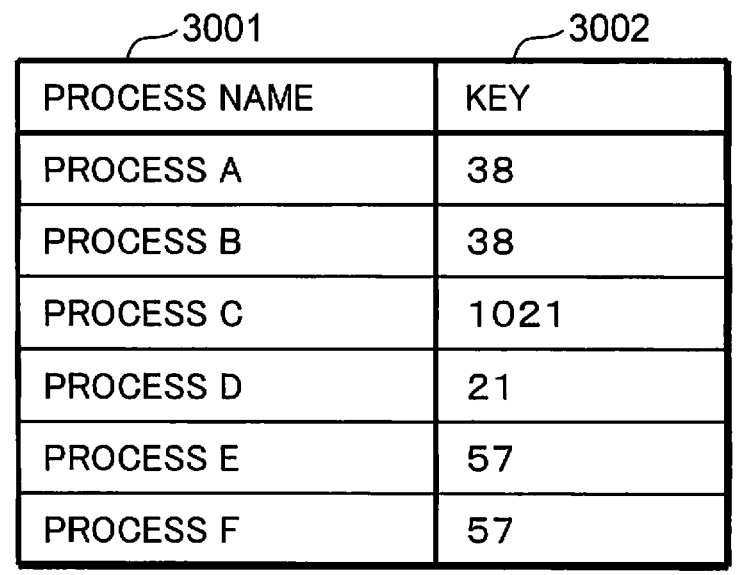
FIG. 3B is a diagram showing an example of a second key generating file according to an embodiment of the present invention.

Key generating files include the first key generating file 104 (refer to FIG. 3A) and the second key generating file 103 (refer to FIG. 3B). The first key generating file 104 is a file in which a first key is allocated to respective processes such that values of the processes become the same as processes of a communication partner.

The second key generating file 103 is a file that is generated by duplicating the first key generating file 104 and transforming the first key allocated to a protected process wishing to communicate with an unprotected process into a second key according to a key transformation rule. Details of the first and second key generating files 104 and 103 will be presented later.

The key generating unit 108 of the parent virtual computer 1 generates a key by referencing the second key generating file 103. On the other hand, the key generating unit 108 of the child virtual computer 2 generates a key by referencing the first key generating file 104.

The process judging unit 109 judges whether a target process that is a process having issued a communication request is the protected process 101 or the unprotected process 102. In doing so, the process judging unit 109 judges whether the virtual computer executing the target process is the parent virtual computer 1 or the child virtual computer 2 based on VM management information managed by the VM managing unit 107. When the target process is run by the parent virtual computer 1, the process judging unit 109 judges that the target process is the protected process 101, and when the target process is run by the child virtual computer 2, the process judging unit 109 judges that the target process is the unprotected process 102.

When the process judging unit 109 judges that the target process is the unprotected process, the key transforming unit 110 transforms a target key from a first key to a second key based on the key transformation rule. In the present embodiment, the key transforming unit 110 is never called by the parent virtual computer 1.

When the process judging unit 109 judges that the target process is an protected process 101, the key judging unit 111 judges whether the target key that is a key generated by the key generating unit 108 is a first key or a second key based on the key transformation rule. In this case, a rule of adding a prescribed value to the first key to transform the first key into the second key is adopted as the key transformation rule. Therefore, when the target key is lower than the prescribed value, the key judging unit 111 judges that the target key is the first key, and when the target key is equal to or higher than the prescribed value, the key judging unit 111 judges that the target key is the second key.

Moreover, while a rule of adding a prescribed value to a first key to transform the first key into a second key has been adopted as the key transformation rule, the key transformation rule is not limited thereto and any rule may be adopted as long as the first key and the second key can be clearly distinguished from each other. For example, a rule may be adopted in which numerical values are assigned to the first key and characters (for example, an alphabet or a character string) corresponding to the respective numerical values are allocated to the second key. Specifically, a rule may be adopted in which numerical values such as 1, 2, and 3 are used as the first key and the respective numerical values are transformed into alphabets such as a, b, and c.

The VM communication managing unit 112 generates the protected memory region 121 that is used for interprocess communication within the parent virtual computer 1 in the shared memory and manages the protected memory region 121. Specifically, the VM communication managing unit 112 generates the in-VM key management table 113 (refer to FIG. 5A) in which memory IDs, keys, and shared memory addresses of the respective protected memory regions 121 are associated with each other, and manages the protected memory regions 121.

In addition, when the key judging unit 111 judges that the target key is a first key, the VM communication managing unit 112 identifies a memory ID of the protected memory region 121 corresponding to the first key from the in-VM key management table 113, notifies the target process of the identified memory ID, and enables the target process to communicate with another protected process 101.

In other words, when the target process is the protected process 101 and the protected process 101 is a process wishing to communicate with another protected process 101, the VM communication managing unit 112 enables both protected processes 101 to communicate with each other within the parent virtual computer 1. Accordingly, the protected process 101 can communicate within the parent virtual computer 1 and information regarding the protected process 101 can be prevented from leaking to the child virtual computer 2 or the hypervisor 3.

The in-VM key management table 113 is a table which is generated by the VM communication managing unit 112 and in which keys, shared memory addresses, and memory IDs of the respective protected memory regions 121 are associated with each other.

When the target key is present in the in-VM key management table 113, the VM communication managing unit 112 notifies the target process of a memory ID corresponding to the target key. On the other hand, when the target key is not present in the in-VM key management table 113, the VM communication managing unit 112 newly generates a protected memory region 121 in the shared memory, assigns a memory ID to the generated protected memory region 121, registers a target key, the memory ID, and a shared memory address in the in-VM key management table 113, and notifies the target process of the memory ID.

The protected memory region 121 is a shared memory which is generated, for example, inside the parent virtual computer 1 and which can only be accessed by the parent virtual computer 1. In addition, the protected memory region 121 is used when protected processes 101 communicate with each other. Moreover, as long as access can be restricted only to the parent virtual computer 1, the protected memory region 121 can be provided on the outside of the parent virtual computer 1.

The child virtual computer 2 is generated by duplicating the parent virtual computer 1. Such a generation of the child virtual computer 2 is performed when, for example, an instruction to start up an unprotected application is issued by the unprotected process 102. Therefore, as shown in FIG. 1, with the exception of comprising the unprotected process 102, the child virtual computer 2 is configured the same as the parent virtual computer 1. However, the key judging unit 111, the VM communication managing unit 112, and the in-VM key management table 113 are never called by the child virtual computer 2.

Examples of unprotected applications include a downloaded application that has been downloaded from the Internet. A downloaded application may contain a computer virus, a malware, or the like. Therefore, the downloaded application is run by the child virtual computer 2. As a result, the downloaded application is quarantined from the protected process 101 and the protected process 101 can be protected.

An operating system 12 of the child virtual computer 2 is generated by duplicating the operating system 11 of the parent virtual computer 1.

The hypervisor 3 duplicates the parent virtual computer 1 to generate the child virtual computer 2 and controls the parent virtual computer 1 and the child virtual computer 2. In addition, the hypervisor 3 comprises an HV communication managing unit 105, an in-HV key management table 106, a VM managing unit 107, and an unprotected memory region 122.

The HV communication managing unit 105 generates the unprotected memory region 122 which is used for both interprocess communication within the child virtual computer 2 and interprocess communication between the parent virtual computer 1 and the child virtual computer 2 inside the shared memory, and manages the unprotected memory region 122. Specifically, the HV communication managing unit 105 generates the in-HV key management table 106 (refer to FIG. 5B) in which memory IDs, keys, and shared memory addresses of the respective unprotected memory regions 122 are associated with each other, and manages the unprotected memory regions 122.

The HV communication managing unit 105 notifies the target process of a memory ID of the unprotected memory region 122 corresponding to a second key and enables the target process to communicate with an unprotected process.

In other words, when the target process is the protected process 101 and the protected process 101 is a process wishing to communicate with the unprotected process 102, the HV communication managing unit 105 enables both processes to communicate with each other using the unprotected memory region 122.

Accordingly, the protected process 101 can communicate with the unprotected process 102 using the unprotected memory region 122 and process communication between virtual computers can be realized. Since communication between the protected process 101 and the unprotected process 102 uses the unprotected memory region 122, the protected memory region 121 is not accessed by the unprotected process 102 and information on other protected processes 101 can be prevented from leaking to the child virtual computer 2.

In addition, when the target process is the unprotected process 102 and the unprotected process 102 is a process wishing to communicate with another unprotected process 102 in the child virtual computer 2 or with an unprotected process 102 in another child virtual computer 2, the HV communication managing unit 105 enables both unprotected processes 102 to communicate with each other using the unprotected memory region 122. Since communication between the unprotected processes 102 uses the unprotected memory region 122, the protected memory region 121 is not accessed by the unprotected process 102 and information on the protected process 101 can be prevented from leaking to the unprotected process 102.

The in-HV key management table 106 is a table which is generated by the HV communication managing unit 105 and in which keys, shared memory addresses, and memory IDs are associated with each other (refer to FIG. 5B).

When a target key is present in the in-HV key management table 106, the HV communication managing unit 105 notifies the target process of a memory ID corresponding to the target key. On the other hand, when the target key is not present in the in-HV key management table 106, the HV communication managing unit 105 newly generates an unprotected memory region 122 in the shared memory, assigns a memory ID to the generated unprotected memory region 122, registers a target key, the memory ID, and a shared memory address in the in-HV key management table 106, and notifies the target process of the memory ID.

The unprotected memory region 122 is a shared memory which is generated, for example, inside the hypervisor 3 and which can be accessed by both the parent virtual computer 1 and the child virtual computer 2. In addition, the unprotected memory region 122 is used when unprotected processes 102 communicate with each other and when the protected process 101 and the unprotected process 102 communicate with each other. Alternatively, the unprotected memory region 122 may be provided outside the hypervisor 3.

The VM managing unit 107 generates and manages VM management information for managing whether each virtual computer corresponds to the parent virtual computer 1 or to the child virtual computer 2. In addition, when duplicating the parent virtual computer 1 to generate the child virtual computer 2, the VM managing unit 107 registers states of the parent virtual computer 1 and the child virtual computer 2 to VM management information.

FIG. 7 is a diagram showing an example of VM management information. In VM management information, one record is allocated to one virtual computer and each record comprises VMID and state fields. VMID is identification information individually assigned to each virtual computer. A symbol string by which the parent virtual computer 1 and the child virtual computer 2 can be distinguished from each other is used as the VMID. In the example shown in FIG. 7, a symbol string of VM_P is assigned to the parent virtual computer 1 and symbol strings of VM_C1, VM_C2, . . . are assigned to the child virtual computers 2, whereby "P" and "C" enable the parent virtual computer 1 and the child virtual computer 2 to be distinguished from each other.

The state indicates a state of each virtual computer. Available states include "issued" and "stand-by". "Issued" indicates a state where any of the processes in a virtual computer has issued a communication request. "Stand-by" indicates a state where a process in a virtual computer is standing by for communication from another process.

In the example shown in FIG. 7, since the protected process 101 of the parent virtual computer 1 with a VMID of VM_P has issued a communication request, "issued" is displayed as the state thereof. Since the unprotected processes 102 of the other child virtual computers 2 have not issued a communication request, "stand-by" is displayed as states thereof.

The key generating unit 108 and the process judging unit 109 reference the VM management information in order to determine whether the target process having issued a communication request is the protected process 101 or the unprotected process 102. Specifically, when a communication request is issued from a target process, the key generating unit 108 and the process judging unit 109 reference the VM management information to identify a record in which "issued" is displayed in the state field. When the VMID of the identified record indicates the parent virtual computer 1, the key generating unit 108 and the process judging unit 109 judge that the target process is the protected process 101, and when the VMID of the identified record indicates the child virtual computer 2, the key generating unit 108 and the process judging unit 109 judge that the target process is the unprotected process 102.

FIG. 2 is a flow chart showing operations of the virtual computer system 0 according to an embodiment of the present invention. Hereinafter, processing during acquisition of a memory ID of a shared memory by the protected process 101 or the unprotected process 102 will be described with reference to FIG. 2.

First, when a communication request is issued by a target process and the key generating unit 108 is called, the key generating unit 108 references VM management information that is managed by the VM managing unit 107 and judges whether the target process is the protected process 101 or the unprotected process 102 (S2001).

In this case, for example, the key generating unit 108 identifies a record in which "issued" is displayed in the state field of the VM management information shown in FIG. 7. When the VMID of the identified record indicates the parent virtual computer 1, the key generating unit 108 judges that the target process is the protected process 101, and when the VMID of the identified record indicates the child virtual computer 2, the key generating unit 108 judges that the target process is the unprotected process 102.

When the key generating unit 108 judges that the target process is the protected process 101 (Y in S2002), the key generating unit 108 references the second key generating file 103 and generates a key (S2003). On the other hand, when the key generating unit 108 judges that the target process is the unprotected process 102 (N in S2002), the key generating unit 108 references the first key generating file 104 and generates a key (S2004).

Next, details of the first and second key generating files 104 and 103 will be described. In the present embodiment, the child virtual computer 2 is generated by duplicating the parent virtual computer 1. Therefore, each virtual computer is likely to be either the parent virtual computer 1 or the child virtual computer 2. In consideration thereof, in the present embodiment, each virtual computer is provided with the second key generating file 103 and the first key generating file 104 so that the key generating unit 108 is able to generate a key of the protected process 101 or the unprotected process 102 regardless of whether each virtual computer is the parent virtual computer 1 or the child virtual computer 2. FIG. 3A is a diagram showing an example of the first key generating file 104 according to an embodiment of the present invention. FIG. 3B is a diagram showing an example of the second key generating file 103 according to an embodiment of the present invention.

As shown in FIG. 3A, in the first key generating file 104, one record is allocated to one process. The first key generating file 104 comprises a field 3001 for storing a process name and a field 3002 for storing a key. In addition, as shown in FIG. 3B, the second key generating file 103 has the same data structure as the first key generating file 104.

The field 3001 stores a process name assigned to each process. The field 3002 stores a key for identifying a shared memory that is used when each process performs interprocess communication.

The second key generating file 103 is a file that is generated by duplicating the first key generating file 104 and, for the protected process 101 wishing to communicate with the unprotected process 102, by transforming a first key into a second key according to a key transformation rule. In this case, a rule of adding a prescribed value to the first key to transform the first key into the second key is adopted as the key transformation rule. For example, 1000 is adopted as the prescribed value.

In the example shown in FIG. 3B, with the exception of a process C, each of the processes is assigned the same key as each of the processes shown in FIG. 3A, clearly indicating that the second key generating file 103 is generated by duplicating the first key generating file 104. On the other hand, the process C is the protected process 101 wishing to communicate with the unprotected process 102. Therefore, a key "1021" that is a second key transformed by adding 1000 to the key "21" shown in FIG. 3A is allocated to the process C.

Moreover, the first and second key generating files 104 and 103 are created in advance by a system designer. As a method of creating the key generating files, for example, the system designer allocates a first key to respective processes so that the processes assume numerical values lower than 1000 to generate the first key generating file 104. Next, the system designer may duplicate the first key generating file 104 and add 1000 to a key of the protected process 101 wishing to communicate with the unprotected process 102 to generate the second key generating file 103.

Returning to FIG. 2, if the target process is the protected process 101 (Y in S2002), the key generating unit 108 identifies a record corresponding to the target process based on the process name of the target process from the second key generating file 103, and generates the key stored in the field 3002 of the identified record as the key of the target process (S2003). The key generating unit 108 then returns the generated key to the target process.

On the other hand, if the target process is the unprotected process 102 (N in S2002), the key generating unit 108 references the first key generating file 104, generates a key in the same manner as in S2003 (S2004), and returns the key to the target process.

Moreover, while the key generating unit 108 reads in the second key generating file 103 and the first key generating file 104 in S2003 and S2004, the present embodiment is not limited thereto. For example, in S2003, the protected process 101 may read in the second key generating file 103 and hand over the second key generating file 103 to the key generating unit 108. In addition, in S2004, the unprotected process 102 may read in the first key generating file 104 and hand over the first key generating file 104 to the key generating unit 108.

Next, the target process sets the acquired key as a target key and calls the process judging unit 109 by specifying the target key (S2005). The process judging unit 109 references the VM management information managed by the VM managing unit 107 and judges whether the target process is the protected process 101 or the unprotected process 102 (S2005).

In this case, the process judging unit 109 references VM information and identifies a record having "issued" displayed in the state field, and when the VMID of the identified record indicates the parent virtual computer 1, judges that the target process is the protected process 101. On the other hand, when the VMID of the identified record indicates the child virtual computer 2, the process judging unit 109 judges that the target process is the unprotected process 102.

In addition, when the process judging unit 109 judges that the target process is the protected process 101 (Y in S2006), the key judging unit 111 judges whether the target key is a first key or a second key (S2007).

At this point, the key judging unit 111 judges a type of the target key according to the key transformation rule described above. For example, in the example shown in FIG. 3B, 1000 has been added to a first key to transform the first key to a second key. Therefore, when the target key is equal to or higher than 1000, the key judging unit 111 judges that the target key is a second key, and when the target key lower than 1000, the key judging unit 111 judges that the target key is a first key.

Moreover, the key judging unit 111 may judge a type of the target key using a key transformation rule registered in advance to the key judging unit 111 by the system designer. Alternatively, the key judging unit 111 may read in the second key generating file 103, decode the key transformation rule, and judge a type of the target key using the decoded key transformation rule. As for a method of decoding the key transformation rule, for example, in the example shown in FIG. 3B, the key judging unit 111 may adopt a method in which keys sharing the same last two digits are identified, and if the identified keys have different numerical values, a difference between numerical values is identified as a prescribed value of a key transformation rule.

Next, when the key judging unit 111 judges that the target key is a first key (Y in S2008), the key judging unit 111 specifies the target key and notifies the VM communication managing unit 112 of a use request for the protected memory region 121 (S2009). On the other hand, when the key judging unit 111 judges that the target key is a second key (N in S2008), the key judging unit 111 specifies the target key and notifies the HV communication managing unit 105 of a use request for the unprotected memory region 122 (S2010).

In S2006, when it is judged that the target process is the unprotected process 102 (N in S2006), the key transforming unit 110 transforms the target key from a first key to a second key according to the key transformation rule (S2011). In other words, the key transforming unit 110 adds the specified value (=1000) to the target key to transform the target key into the second key.

Next, the key transforming unit 110 specifies the target key that has been transformed into the second key in S2011, and notifies the HV communication managing unit 105 of a use request for the unprotected memory region 122 (S2010).

Details of processing for generating or sharing a shared memory will now be described. In the present embodiment, when a target process is a protected process wishing to communicate with another protected process 101, a use request for the protected memory region 121 is notified to the VM communication managing unit 112 (S2009), and when the target process is the protected process 101 or the unprotected process 102 wishing to communicate with an unprotected process 102, a use request for the unprotected memory region 122 is notified to the HV communication managing unit 105 (S2010).

Figure 4:
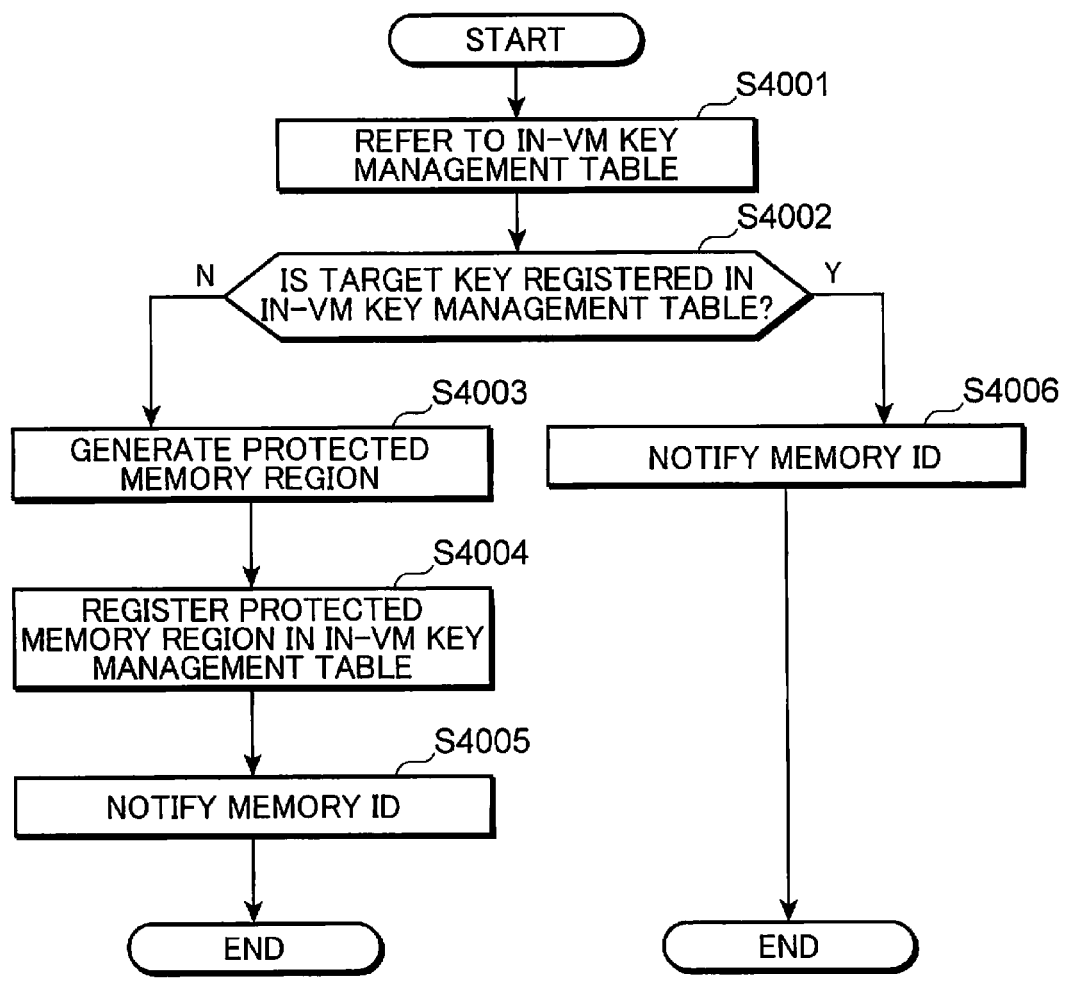
FIG. 4 is a flow chart showing processing when a use request for a protected memory region is notified to a VM communication managing unit in an embodiment of the present invention.

In consideration thereof, first, processing when a use request is notified to the VM communication managing unit 112 will be described. FIG. 4 is a flow chart showing processing when a use request for the protected memory region 121 is notified to the VM communication managing unit 112 in an embodiment of the present invention. First, the VM communication managing unit 112 references the in-VM key management table 113 (S4001) and judges whether or not a target key is registered in the in-VM key management table 113 (S4002).

FIG. 5A is a diagram showing an example of the in-VM key management table 113. As shown in FIG. 5A, one record is allocated to one protected memory region 121 in the in-VM key management table 113. Each record comprises a key field 5001, a shared memory address field 5002, and a memory ID field 5003.

A shared memory address is a start address of each protected memory region 121. A memory ID is identification information uniquely assigned to each protected memory region 121. In this manner, the in-VM key management table 113 stores a key, a shared memory address, and a memory ID of each protected memory region 121 in association with each other.

Therefore, when the target key specified by the key judging unit 111 is present in the in-VM key management table 113, the VM communication managing unit 112 judges that the target key is registered in the in-VM key management table 113 (Y in S4002), and when the target key is not present in the in-VM key management table 113, the VM communication managing unit 112 judges that the target key is not registered in the in-VM key management table 113 (N in S4002).

Next, the VM communication managing unit 112 uses the target key to generate the protected memory region 121 in the process communicating unit 21 (S4003). Subsequently, the VM communication managing unit 112 registers the generated protected memory region 121 in the in-VM key management table 113 (S4004). In this case, the VM communication managing unit 112 registers the target key used when generating the protected memory region 121 and a start address and a memory ID of the generated protected memory region 121 in the in-VM key management table 113. Subsequently, the VM communication managing unit 112 notifies the protected process 101 of the memory ID of the generated protected memory region 121 (S4005). On the other hand, when the target key is registered in the in-VM key management table 113 (Y in S4002), the VM communication managing unit 112 notifies the protected process 101 of a memory ID corresponding to the target key (S4006).

Accordingly, the memory ID of the protected memory region 121 is notified to the protected process 101 wishing to communicate with another protected process 101.

Next, processing when a use request for the unprotected memory region 122 is notified to the HV communication managing unit 105 will be described. FIG. 9 is a flow chart showing processing when a use request for the unprotected memory region 122 is notified to the HV communication managing unit 105 in a virtual computer system according to an embodiment of the present invention. First, the HV communication managing unit 105 references the in-HV key management table 106 (S9001) and judges whether or not a target key is registered in the in-HV key management table 106 (S9002).

FIG. 5B is a diagram showing an example of the in-HV key management table 106. As shown in FIG. 5B, one record is allocated to one unprotected memory region 122 in the in-HV key management table 106. Each record comprises a key field 5001, a shared memory address field 5002, and a memory ID field 5003.

A shared memory address is a start address of each unprotected memory region 122. A memory ID is identification information uniquely assigned to each unprotected memory region 122. In this manner, the in-HV key management table 106 stores a key, a shared memory address, and a memory ID of each unprotected memory region 122 in association with each other.

When the target key is not registered in the in-HV key management table 106 (N in S9002), the HV communication managing unit 105 uses the target key to generate the unprotected memory region 122 in the hypervisor 3 (S9003).

Next, in the same manner as in S4004, the HV communication managing unit 112 registers the generated unprotected memory region 122 in the in-HV key management table 106 (S9004). Subsequently, in the same manner as in S4005, the HV communication managing unit 112 notifies the memory ID of the generated unprotected memory region 122 to the protected process 101 or the unprotected process 102 that had issued a communication request (S9005). On the other hand, when the target key is not registered in the in-HV key management table 106 (Y in S9002), the HV communication managing unit 105 notifies the protected process 101 of a memory ID corresponding to the target key or the unprotected process 102 that had issued the communication request (S9006).

Accordingly, the memory ID is notified to the protected process 101 and the unprotected process 102 wishing to communicate with another unprotected process 102.

Figure 6:
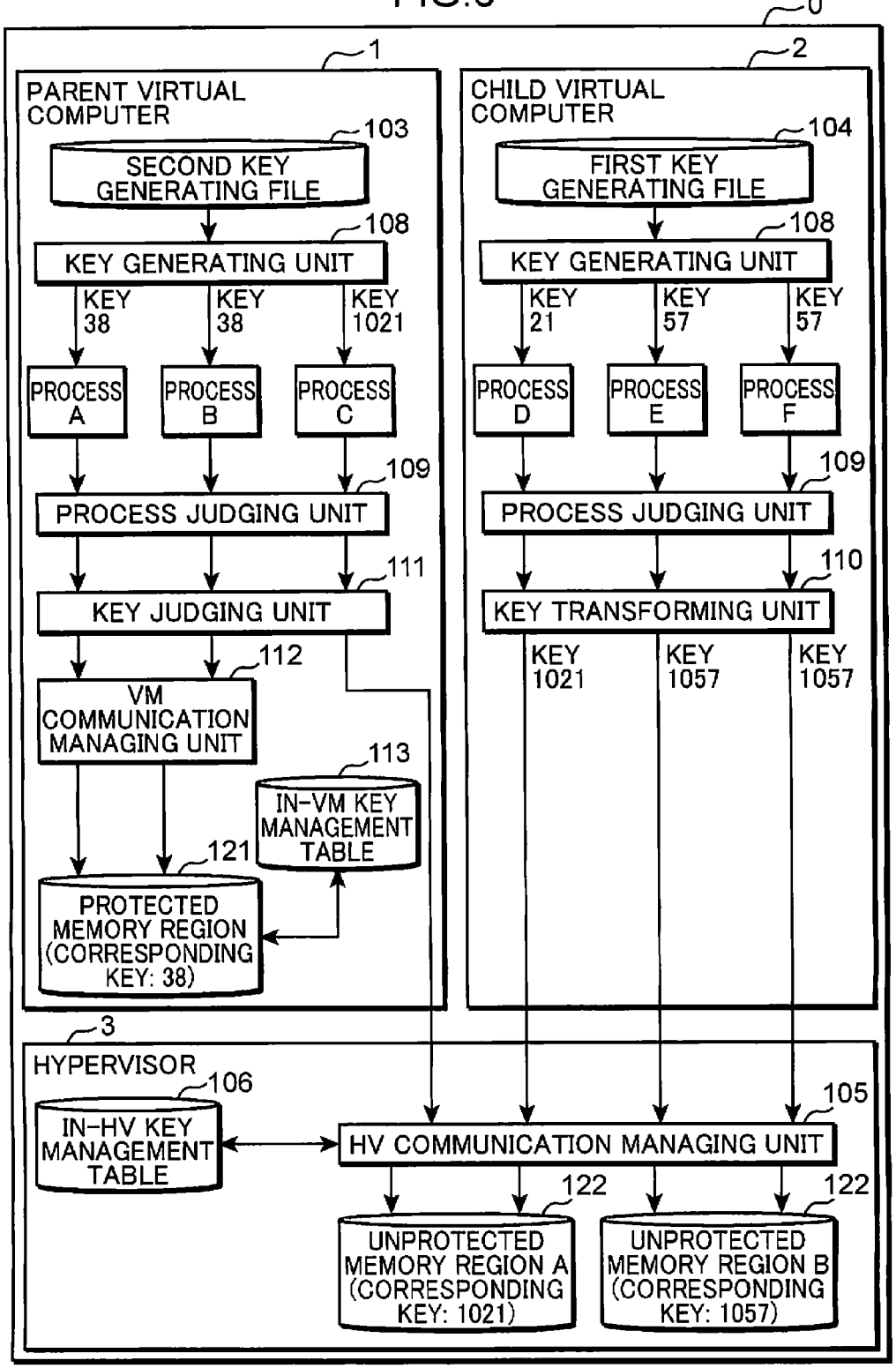
FIG. 6 is a diagram showing a flow of processing from generation of a key to notification of a memory ID in a virtual computer system according to an embodiment of the present invention.

Next, an example of interprocess communication in the virtual computer system 0 according to an embodiment of the present invention will be described. FIG. 6 is a diagram showing a flow of processing from generation of a key to notification of a memory ID in the virtual computer system 0 according to an embodiment of the present invention. In FIG. 6, a process A, a process B, and a process C are protected processes 101 and a process D, a process E, and a process F are unprotected processes 102.

Moreover, in FIG. 6, FIG. 3B is adopted as the second key generating file 103 and FIG. 3A is adopted as the first key generating file 104.

In addition, a rule of adding 1000 to a first key to transform the first key into a second key is adopted as the key transformation rule. Therefore, the key of the process C is 1021 obtained by adding 1000 to the key "21" of the process C in FIG. 3A.

First, interprocess communication within the parent virtual computer 1 will be described. Here, a case will be described in which the protected memory region 121 is generated in response to a communication request from the process A and the process B uses the generated protected memory region 121 to communicate with the process A.

First, the process A calls the key generating unit 108. Next, the key generating unit 108 references the second key generating file 103 and returns a key "38" of the process A to the process A. At this point, since the process A is being run on the parent virtual computer 1, the key generating unit 108 judges that the process A is a protected process 101. Therefore, the key generating unit 108 references the second key generating file 103.

Next, the process A specifies the key "38" and calls the process judging unit 109. Subsequently, since the process A is being run on the parent virtual computer 1, the process judging unit 109 judges that the process A is a protected process 101.

Next, since the key "38" of the process A is lower than 1000, the key judging unit 111 judges that the key "38" is a first key. Since the key "38" is a first key, the key judging unit 111 specifies the key "38" and notifies the VM communication managing unit 112 of a use request for the protected memory region 121.

Subsequently, the VM communication managing unit 112 judges whether or not the key "38" is registered in the in-VM key management table 113. In this case, the key "38" has not yet been registered in the in-VM key management table 113. Therefore, the VM communication managing unit 112 uses the key "38" to generate the protected memory region 121.

Next, the VM communication managing unit 112 registers the generated protected memory region 121 in the in-VM key management table 113 and notifies the process A of the memory ID of the protected memory region 121.

Subsequently, the process B calls the key generating unit 108. The key generating unit 108 then references the second key generating file 103 and returns a key "38" of the process B to the process B. At this point, since the process B is being run on the parent virtual computer 1, the key generating unit 108 judges that the process A is a protected process 101. Therefore, the key generating unit 108 references the second key generating file 103.

Next, the process B specifies the key "38" and calls the process judging unit 109. Subsequently, since the process B is being run on the parent virtual computer 1, the process judging unit 109 judges that the process B is a protected process 101.

Next, since the key "38" of the process B is lower than 1000, the key judging unit 111 judges that the key "38" is a first key. Since the key "38" is a first key, the key judging unit 111 notifies the VM of a use request for the protected memory region 121 communication managing unit 112.

Subsequently, the VM communication managing unit 112 judges whether or not the key "38" is registered in the in-VM key management table 113. In this case, since the protected memory region 121 with the key "38" is registered in the in-VM key management table 113, the memory ID of the protected memory region 121 is notified to the process B.

According to the processing described above, the processes A and B can communicate with each other using the protected memory region 121 identified by the key "38".

In a converse manner to the description provided above, even when the protected memory region 121 with the key "38" is generated in response to a communication request by the process B, the memory ID of the protected memory region 121 with the key "38" is notified to the process A and the processes A and B can communicate with each other. This is because the same key "38" is assigned to the processes A and B in the second key generating file 103, and since both processes are protected processes 101, a key transformation is not performed.

Next, interprocess communication within the child virtual computer 2 will be described. Here, a case will be described in which the unprotected memory region 122 is generated in response to a communication request from the process E and the process F uses the generated unprotected memory region 122 to communicate with the process E.

First, the process E calls the key generating unit 108. Next, the key generating unit 108 references the first key generating file 104 and returns a key "57" of the process E to the process E. At this point, since the process E is being run on the child virtual computer 2, the key generating unit 108 judges that the process E is an unprotected process 102. Therefore, the key generating unit 108 references the first key generating file 104.

Next, the process E specifies the key "57" and calls the process judging unit 109. Subsequently, since the process E is being run on the child virtual computer 2, the process judging unit 109 judges that the process E is an unprotected process 102.

Next, since the process E is the unprotected process 102, the process judging unit 109 specifies the key "57" and calls the key transforming unit 110.

Subsequently, the key transforming unit 110 adds 1000 to the key "57" to transform the key "57" from a first key to a second key, specifies the key "1057" after transformation, and notifies the HV communication managing unit 105 of a use request for the unprotected memory region 122.

Next, the HV communication managing unit 105 judges whether or not the key "1057" is registered in the in-HV key management table 106. In this case, the key "1057" has not yet been registered in the in-HV key management table 106. Therefore, the HV communication managing unit 105 uses the key "1057" to generate an unprotected memory region B.

Subsequently, the HV communication managing unit 105 registers the generated unprotected memory region B in the in-HV key management table 106 and notifies the process E of the memory ID of the unprotected memory region B.

Next, the process F calls the key generating unit 108. The key generating unit 108 then references the first key generating file 104 and returns a key "57" of the process F to the process F. At this point, since the process F is being run on the child virtual computer 2, the key generating unit 108 judges that the process F is an unprotected process 102. Therefore, the key generating unit 108 references the first key generating file 104.

Subsequently, the process F specifies the key "57" and calls the process judging unit 109. Subsequently the process F specifies the key "57" and calls the process judging unit 109. Since the process F is being run on the child virtual computer 2, the process judging unit 109 judges that the process F is an unprotected process 102.

Next, since the process F is the unprotected process 102, the process judging unit 109 specifies the key "57" and calls the key transforming unit 110.

Subsequently, the key transforming unit 110 adds 1000 to the key "57" to transform the key "57" from a first key to a second key, specifies the key "1057" after transformation, and notifies the HV communication managing unit 105 of a use request for the unprotected memory region 122.

Next, the HV communication managing unit 105 judges whether or not the key "1057" is registered in the in-HV key management table 106. In this case, since the unprotected memory region B with the key "1057" is already registered in the in-HV key management table 106, the memory ID of the unprotected memory region B is notified to the process F.

According to the processing described above, the processes E and F can communicate with each other using the unprotected memory region B identified by the key "1057".

In a converse manner to the description provided above, even when the unprotected memory region B with the key "1057" is generated in response to a communication request by the process F, the memory ID of the unprotected memory region B with the key "1057" is notified to the process E and the processes E and F can communicate with each other. This is because the same key "57" is assigned to the processes E and F in the first key generating file 104, and since both processes are unprotected processes 102, the keys are transformed into the key "1057" according to the same key transformation rule.

As described above, when a communication request is issued from the unprotected process 102, the key is invariably transformed from a first key to a second key by the key transforming unit 110. Therefore, the protected memory region 121 is not accessed by the unprotected process 102 and the protected process 101 can be prevented from being altered or referenced by the unprotected process 102.

Finally, interprocess communication between virtual computers will be described. Here, a case will be described in which an unprotected memory region A is generated in response to a communication request from the process D and the process C uses the generated unprotected memory region A to communicate with the process D.

First, the process D calls the key generating unit 108. The key generating unit 108 then references the first key generating file 104 and returns a key "21" of the process D to the process D. At this point, since the process D is being run on the child virtual computer 2, the key generating unit 108 judges that the process D is an unprotected process 102. Therefore, the key generating unit 108 references the first key generating file 104.

Next, the process D specifies the key "21" and calls the process judging unit 109. Subsequently, since the process D is being run on the child virtual computer 2, the process judging unit 109 judges that the process D is an unprotected process 102.

Next, since the process D is the unprotected process 102, the process judging unit 109 specifies the key "21" and calls the key transforming unit 110.

Subsequently, the key transforming unit 110 adds 1000 to the key "21" to transform the key "21" from a first key to a second key, specifies the key "1021" after transformation, and notifies the HV communication managing unit 105 of a use request for the unprotected memory region 122.

Next, the HV communication managing unit 105 judges whether or not the key "1021" is registered in the in-HV key management table 106. In this case, the key "1021" has not yet been registered in the in-HV key management table 106. Therefore, the HV communication managing unit 105 uses the key "1021" to generate an unprotected memory region A.

Subsequently, the HV communication managing unit 105 registers the generated unprotected memory region A in the in-HV key management table 106 and notifies the process D of the memory ID of the unprotected memory region A.

Next, the process C calls the key generating unit 108. The key generating unit 108 then references the second key generating file 103 and returns a key "1021" of the process C to the process C. The key "1021" is a key transformed in advance to a second key by adding 1000 to the first key "21" according to the key transformation rule. Since the process C is being run on the parent virtual computer 1, the key generating unit 108 judges that the process C is a protected process 101. Therefore, the key generating unit 108 references the second key generating file 103.

Next, the process C specifies the key "1021" and calls the process judging unit 109. Subsequently, since the process C is being run on the parent virtual computer 1, the process judging unit 109 judges that the process C is a protected process 101.

Next, since the key "1021" of the process C is lower than 1000, the key judging unit 111 judges that the key "1021" is a second key. Since the key"1021" is a second key, the key judging unit 111 specifies the key "1021" and notifies the HV communication managing unit 105 of a use request for the unprotected memory region 122.

Next, the HV communication managing unit 105 judges whether or not the key "1021" is registered in the in-HV key management table 106. In this case, the key "1021" has already been registered in the in-HV key management table 106. Therefore, the HV communication managing unit 105 returns the memory ID of the unprotected memory region A corresponding to the key "1021" to the process C.

According to the processing described above, the processes C and D can communicate with each other using the unprotected memory region A identified by the key "1021".

In a converse manner to the description provided above, even when the unprotected memory region A with the key "1021" is generated in response to a communication request by the process C, the memory ID of the unprotected memory region A with the key "1021" is notified to the process D and the processes C and D can communicate with each other.

This is because the key of the process C registered in the second key generating file 103 is "1021", the key "21" of the process D is transformed to "1021" by the key transformation rule and, consequently, the two keys match each other.

In other words, when the processes C and D communicate with each other, the key of both processes eventually assume a same value, a same memory ID is notified to both processes, and both processes can communicate with each other by sharing a same unprotected memory region A.

In addition, since the processes C and D communicate with each other using the unprotected memory region A, the process D need no longer access the protected memory region 121, and information handled by other processes (the processes A and B) in the parent virtual computer 1 can be prevented from leaking out of the parent virtual computer 1.

Furthermore, since the process D is an unprotected process 102, the process D is invariably transformed into a second key. Therefore, unless the key of the process C is transformed in advance to the second key in the second key generating file 103, the process D is unable to communicate with the process C. The transformation of the key of the process C in the second key generating file 103 has been performed in advance under management of the system designer.

Accordingly, since the process D is unable to communicate with the process C unless permission is obtained from the system designer, the process C that is a protected process can be prevented from being communicated by the process D that is an unprotected process without permission. As a result, information handled by the process C can be prevented from leaking to a process outside of the management of the system designer.

Moreover, as long as the key of the protected process 101 wishing to communicate with the unprotected process 102 is transformed in the first key generating file 104 to a second key in order to generate the second key generating file 103, the system designer can enable the protected process 101 and the unprotected process 102 to communicate with each other. As a result, the system designer can realize process communication between virtual computers without having to alter a protected application or an unprotected application.

In addition, the HV communication managing unit 105 manages the unprotected memory region 122 by associating a second key and a memory ID with each other. When a communication request is issued from the unprotected process 102, a second key transformed by the key transforming unit 110 is notified to the HV communication managing unit 105. Even when a communication request is issued from the protected process 101 wishing to communicate with the unprotected process 102, a second key is notified to the HV communication managing unit 105.

Therefore, a memory ID of the unprotected memory region 122 is invariably notified to the protected process 101 and the unprotected process 102 wishing to communicate with another unprotected process 102. As a result, the unprotected process 102 need no longer access the protected memory region 121 and the protected process 101 can be protected.

Furthermore, the VM communication managing unit 112 manages the protected memory region 121 by associating a first key and a memory ID with each other. When a communication request is issued from the protected process 101 wishing to communicate with another protected process 101, a first key is notified to the VM communication managing unit 105.

Therefore, a memory ID of the protected memory region 121 is invariably notified to the protected process 101 wishing to communicate with another protected process 101. As a result, the protected process 101 that communicates with another protected process uses only the protected memory region 121 and information on the protected process 101 can be prevented from leaking to the unprotected process 102.

Moreover, while the present embodiment is arranged such that the parent virtual computer 1 runs the protected process 101 and the child virtual computer 2 runs the unprotected process 102, the unprotected process 102 may be run by the parent virtual computer 1 and the protected process 101 may be run by the child virtual computer 2.

In this case, the child virtual computer 2 may be configured to run functions of the parent virtual computer 1 shown in FIG. 1 and the parent virtual computer 1 may be configured to run functions of the child virtual computer 2 shown in FIG. 1.

In addition, while the present embodiment is arranged such that the protected memory region 121 is generated in the parent virtual computer 1 and the unprotected memory region 122 is generated in the hypervisor 3, the protected memory region 121 and the unprotected memory region 122 may be generated in the hypervisor 3. In this case, by configuring the protected memory region 121 so as to be accessible only by the parent virtual computer 1, the protected process 101 can be protected from the unprotected process 102.

Figure 8:
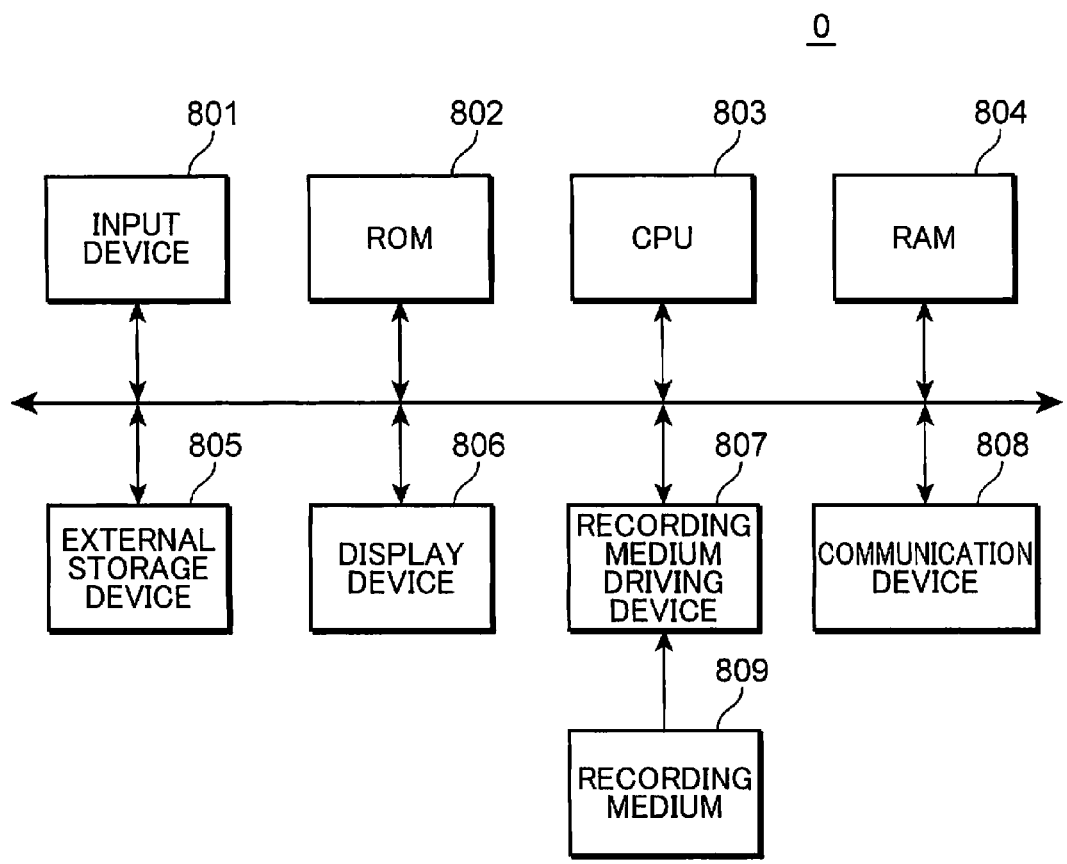
FIG. 8 is a block diagram showing a hardware configuration of a virtual computer system according to an embodiment of the present invention.

Finally, a hardware configuration of the virtual computer system 0 according to the present embodiment will be described. FIG. 8 is a block diagram showing a hardware configuration of the virtual computer system 0 according to an embodiment of the present invention.

The virtual computer system 0 is constituted by, for example, a computer, and comprises an input device 801, a ROM (read-only memory) 802, a CPU (central processing unit) 803, a RAM (random access memory) 804, an external storage device 805, a display device 806, a recording medium driving device 807, and a communication device 808. The respective blocks are connected to an internal bus. Various data and the like are exchanged via the bus and various processes are run under control of the CPU 803.

The input device 801 is constituted by a keyboard, a mouse, or the like and is used by a user to input various data. The ROM 802 stores a system program such as a BIOS (Basic Input/Output System). The external storage device 805 is constituted by a hard disk drive or the like and stores an operating system, a virtual computer program, or the like. The CPU 803 reads the operating system, the virtual computer program, or the like from the external storage device 805 and controls operations of the respective blocks. The RAM 804 is used as a working area or the like for the CPU 803.

The display device 806 is constituted by, for example, a liquid crystal display or an organic EL display, and displays various images under the control of the CPU 803. The recording medium driving device 807 is constituted by a CD-ROM drive, a flexible disk drive, or the like.

Moreover, the virtual computer program is stored in a computer-readable recording medium 809 such as a CD-ROM and provided to a user. By having the recording medium driving device 807 read in the recording medium 809, the user installs the virtual computer program on a computer. Alternatively, the virtual computer program may be installed on a computer by having the virtual computer program stored in a server on the Internet and downloading the virtual computer program from the server.

The communication device 808 is constituted by, for example, a communication device for connecting the computer to the Internet, and exchanges data with other devices via the Internet under the control of the CPU 803.

Moreover, the first and second key generating files 104 and 103, the in-VM key management table 113, the in-HV key management table 106, the VM managing unit 107, the protected memory region 121, and the unprotected memory region 122 shown in FIG. 1 are constituted by a storage device such as the ROM 802, the RAM 804, and the external storage device 805 and a program module included in a virtual computer program that controls the storage device. In addition, the protected process 101, the key generating unit 108, the process judging unit 109, the key transforming unit 110, the key judging unit 111, the VM communication managing unit 112, and the HV communication managing unit 105 shown in FIG. 1 are program modules included in the virtual computer program and are executed by the CPU 803.

Although the respective functional blocks of the virtual computer system 0 shown in FIG. 1 are typically realized as a program processed by cooperation between a processor and an external memory, the respective functional blocks may alternatively be realized by an LSI that is an integrated circuit. The respective functional blocks may be individually configured as single chips or a single chip may be configured which includes a part of or all of these functional blocks. Although the term LSI has been used, other terms such as an IC, a system LSI, a super LSI, and an ultra LSI may be used depending on degrees of integration.

When the virtual computer system 0 is constituted by an integrated circuit, for example, the key generating unit 108, the process judging unit 109, the key transforming unit 110, the key judging unit 111, the VM communication managing unit 112, and the HV communication managing unit 105 may be integrated.

Furthermore, methods of realizing an integrated circuit are not limited to an LSI, and an integrated circuit may be realized using a dedicated circuit or a general-purpose processor. An FPGA (Field Programmable Gate Array) that can be programmed after LSI production or a reconfigurable processor that allows reconfiguration of connections and settings of circuit cells inside an LSI after LSI production may also be used.

Moreover, if techniques for realizing integrated circuits which replace LSIs should emerge due to progress made in semiconductor technology or due to derivative technology, it is obvious that the function blocks may be integrated using such techniques.

In addition, the virtual computer system 0 is applicable to any calculator, electronic device, information device, AV device, communication device, and household electrical appliance as long as the device or appliance takes the form of a computing device comprising a processor and a timer. For example, the virtual computer system 0 can be applied to a PC (personal computer), a mobile information terminal (such as a mobile phone, a smart phone, and a PDA), a television set, a hard disk recorder, various disk recorders using a DVD, a Blu-ray disc, or the like, various disk players using a DVD, a Blu-ray disc, or the like, a car navigation system, and the like.

Moreover, the description provided above is merely exemplary of the present invention in every way and is not intended to limit the scope of the invention. It is to be understood that various improvements and modifications will be apparent to those skilled in the art without departing from the scope of the present invention.

Summary of Embodiment of Present Invention

The technical features of the virtual computer system according to an embodiment of the present invention can be summarized as follows.

(1) A virtual computer system according to an embodiment of the present invention is a virtual computer system comprising a first virtual computer that executes a protected process, a second virtual computer that executes an unprotected process, and a hypervisor that controls the first and second virtual computers, wherein the first and second virtual computers have: a key generating unit which generates a second key that has been transformed from a first key according to a predetermined key transformation rule when a communication request is issued by the protected process wishing to communicate with the unprotected process and which generates the first key when a communication request is issued by another process; a process judging unit which judges whether a target process that is a process having issued the communication request is the protected process or the unprotected process; a key judging unit which judges whether a target key that is a key generated by the key generating unit is the first key or the second key when the process judging unit judges that the target process is the protected process; and a VM communication managing unit which notifies of the target process of a memory ID of a protected memory region corresponding to the first key when the key judging unit judges that the target key is the first key, the hypervisor comprises: an HV communication managing unit which notifies the target process of a memory ID of an unprotected memory region corresponding to the second key when the key judging unit judges that the target key is the second key, the first and second virtual computers further comprise: a key transforming unit which transforms the target key from the first key to the second key based on the key transformation rule when the process judging unit judges that the target process is the unprotected process, and the HV communication managing unit notifies the target process of a memory ID of the unprotected memory region corresponding to the second key transformed by the key transforming unit.

According to the configuration described above, when a communication request is issued from a protected process wishing to communicate with an unprotected process, a second key is generated by the key generating unit, and when a communication request is issued from another process (a protected process wishing to communicate between protected processes and an unprotected process), a first key is generated by the key generating unit. Here, the second key is obtained by transforming the first key according to a predetermined key transformation rule.

When a target process that is a process having issued a communication request is judged to be a protected process by the process judging unit, the key judging unit judges whether a target key that is a key generated by the key generating unit is a first key or a second key.

When the key judging unit judges that the target key is the first key, the target process is judged to be a protected process wishing to communicate with another protected process or, in other words, a protected process wishing to communicate within the first virtual computer, and a memory ID of a protected memory region corresponding to the first key is notified to the protected process.

Accordingly, the protected process wishing to communicate within the first virtual computer can access the protected memory region and communicate with another protected process.

On the other hand, when the key judging unit judges that the target key is the second key, the target process is judged to be a protected process wishing to communicate with an unprotected process or, in other words, a protected process that attempts to communicate between virtual computers, and a memory ID corresponding to an unprotected memory region key is notified to the protected process.

Accordingly, the protected process wishing to communicate with an unprotected process can access the unprotected memory region and communicate with the unprotected process.

As described above, in the present configuration, a memory region is divided into a protected memory region and an unprotected memory region, communication between a protected process and an unprotected process is performed in the unprotected memory region, and communication between protected processes is performed in the protected memory region. Therefore, the protected process can be protected from the unprotected process and, at the same time, communication between virtual computers can be realized.

Furthermore, when the process judging unit judges that the target process is an unprotected process, the target key is transformed from the first key to the second key by the key transforming unit. Therefore, a memory ID of an unprotected memory region is notified to the unprotected process. Accordingly, the unprotected process communicates using only the unprotected memory region and the protected process can be protected from the unprotected process.

(2) In the virtual computer system described above, for example, the key generating unit generates keys by referencing key generating files in which keys are allocated to respective processes in advance.

According to the configuration described above, since a key is generated by referencing a key generating file in which keys are allocated to respective processes in advance, the key can be generated at high speed. In addition, by setting a key generating file, a system designer can enable a process to communicate with a desired process. Therefore, the system designer can manage processes without having to change applications.

(3) In the virtual computer system described above, for example, the key generating file comprises: a first key generating file in which a first key is allocated to each process such that a value of the process becomes the same as that of a process of a communication partner; and a second key generating file generated by duplicating the first key generating file and transforming a first key allocated to a protected process that communicates with the unprotected process into a second key according to the key transformation rule, wherein when the communication request is issued from the protected process, the key generating unit generates a key by referencing the second key generating file, and when the communication request is issued from the unprotected process, the key generating unit generates a key by referencing the first key generating file.

According to the configuration described above, when a communication request is issued from a protected process, the key generating unit generates a key by referencing the second key generating file. Here, in the second key generating file, a second key is allocated to a protected process wishing to communicate with an unprotected process, and a first key is allocated to other processes (a protected process wishing to communicate between protected processes and an unprotected process). Therefore, the key generating unit generates a second key for a protected process wishing to communicate with an unprotected process.

On the other hand, a first key is generated by referencing the first key generating file for an unprotected process wishing to communicate with the protected process. In this case, the generated first key is the same as the first key before transformation to the second key generated for the protected process that is a communication partner.

In addition, since the first key generated for the unprotected process is transformed into a second key according to the key transformation rule by the key transforming unit, the second key after transformation becomes the same as the second key generated for the protected process that is the communication partner.

Therefore, the unprotected process and the protected process that becomes a communication partner of the unprotected process are eventually provided with a same second key and a same memory ID of an unprotected memory region is notified to both processes. Accordingly, both processes can communicate with each other using the unprotected memory region.

On the other hand, the key generating unit generates a first key by referencing the second key generating file for a protected process wishing to communicate with a protected process. Here, in the second key generating file, a same first key is allocated to protected processes that become communication partners. Therefore, a same memory ID of a protected memory region is notified to both protected processes. Accordingly, both protected processes can communicate with each other using the protected memory region.

Furthermore, when a communication request is issued from an unprotected process wishing to communicate between unprotected processes, the key generating unit references the first key generating file and generates a same first key for both unprotected processes. In addition, since the first key is transformed into a second key by the key transforming unit, the keys of both unprotected processes eventually become a same second key. Accordingly, a same memory ID of an unprotected memory region is notified to both unprotected processes, and both unprotected processes can communicate with each other using the unprotected memory region.

(4) In the virtual computer system described above, for example, the key transformation rule is a rule for adding a prescribed value to the first key to transform the first key into the second key, and when the target key is lower than the prescribed value, the key judging unit judges that the target key is the first key, and when the target key is equal to or higher than the prescribed value, the key judging unit judges that the target key is the second key.

According to the configuration described above, the first key and the second key can be distinguished from each other using a simple rule in which the first key becomes the second key by adding a prescribed value to the first key.

(5) In the virtual computer system described above, for example, when the key judging unit judges that the target key is the first key, the key judging unit notifies the VM communication managing unit of a use request for the protected memory region, and when the key judging unit judges that the target key is the second key, the key judging unit notifies the HV communication managing unit of a use request for the unprotected memory region.

According to the configuration described above, when the key judging unit judges that the target key is the first key, a use request for the protected memory region is notified to the VM communication managing unit on the assumption that a communication request has been issued from the protected process wishing to communicate with another protected process. Accordingly, a memory ID of the protected memory region is notified to the protected processes wishing to communicate within the first virtual computer.

On the other hand, when the key judging unit judges that the target key is the second key, a use request for the protected memory region is notified to the HV communication managing unit on the assumption that a communication request has been issued from a process wishing to communicate with an unprotected process. Accordingly, a memory ID of the unprotected memory region is notified to the protected processes wishing to communicate with an unprotected process.

(6) In the virtual computer system described above, for example, the hypervisor further comprises a VM managing unit that manages VM management information indicating whether each virtual computer is the first virtual computer or the second virtual computer, the process judging unit judges whether a virtual computer executing the target process corresponds to the first virtual computer or the second virtual computer based on the VM management information, judges that the target process is the protected process when the virtual computer executing the target process is judged to correspond to the first virtual computer, and judges that the target process is the unprotected process when the virtual computer executing the target process is judged to correspond to the second virtual computer.

VM management information indicates whether each virtual computer is the first virtual computer or the second virtual computer. Meanwhile, the first virtual computer runs a protected process and the second virtual computer runs an unprotected process. Therefore, by using the VM management information, a judgment of whether a target process is a protected process or an unprotected process can be made accurately.

(7) In the virtual computer system described above, for example, the first virtual computer is a parent virtual computer and the second virtual computer is a child virtual computer generated by duplicating the parent virtual computer.

According to the configuration described above, when the first virtual computer is set as a parent virtual computer and the second virtual computer is set as a child computer, a protected process can be protected from an unprotected process and, at the same time, communication between a protected process and an unprotected process can be realized.

(8) In the virtual computer system described above, for example, the second virtual computer is a parent virtual computer and the first virtual computer is a child virtual computer generated by duplicating the parent virtual computer.

According to the configuration described above, when the second virtual computer is set as a parent virtual computer and the first virtual computer is set as a child computer, a protected process can be protected from an unprotected process and, at the same time, communication between a protected process and an unprotected process can be realized.

(9) In the virtual computer system described above, for example, the protected memory region is generated in a shared memory that is accessible only by the first virtual computer, and the unprotected memory region is generated in a shared memory that is accessible by both first and second virtual computers.

According to the configuration described above, since the protected memory region is accessible only by the first virtual computer, information in the protected memory region can be prevented from leaking to the second virtual computer and the protected process can be protected.

INDUSTRIAL APPLICABILITY

The virtual computer system according to the present invention is effective in a wide range of fields as long as an information-processing device is used. For example, in addition to computers such as a large-scale computer and a personal computer, the virtual computer system according to the present invention can be used in various household electrical appliances such as a digital television set and a storage/reproduction device, communication devices such as a mobile phone, industrial equipment, control equipment, vehicle-mounted equipment, and the like.

The invention claimed is:

1. A virtual computer system comprising a processor, a first virtual computer that executes a protected process using the processor, a second virtual computer that executes an unprotected process, and a hypervisor that controls the first and second virtual computers, wherein
the first and second virtual computers have:
a key generating unit which generates a second key that has been transformed from a first key according to a predetermined key transformation rule when a communication request is issued by the protected process that communicates with the unprotected process and which generates the first key when a communication request is issued by another process;
a process judging unit which judges whether a target process that is a process having issued the communication request is the protected process or the unprotected process;
a key judging unit which judges whether a target key that is a key generated by the key generating unit is the first key or the second key when the process judging unit judges that the target process is the protected process; and
a virtual machine communication managing unit which notifies the target process of a memory identification of a protected memory region corresponding to the first key when the key judging unit judges that the target key is the first key,
the hypervisor comprises:
a hypervisor communication managing unit which notifies the target process of a memory identification of an unprotected memory region corresponding to the second key when the key judging unit judges that the target key is the second key,
the first and second virtual computers further comprise:
a key transforming unit which transforms the target key from the first key to the second key based on the key transformation rule when the process judging unit judges that the target process is the unprotected process, and
the hypervisor communication managing unit notifies the target process of a memory identification of an unprotected memory region corresponding to the second key transformed by the key transforming unit.

2. The virtual computer system according to claim 1, wherein the key generating unit generates keys by referencing key generating files in which keys are allocated to respective processes in advance.

3. The virtual computer system according to claim 2, wherein
the key generating file comprises:
a first key generating file in which a first key is allocated to each process such that a value of the process becomes the same as that of a process of a communication partner; and
a second key generating file generated by duplicating the first key generating file and transforming a first key allocated to a protected process that communicates with the unprotected process into a second key according to the key transformation rule, and when the communication request is issued from the protected process, the key generating unit generates a key by referencing the second key generating file, and when the communication request is issued from the unprotected process, the key generating unit generates a key by referencing the first key generating file.

4. The virtual computer system according to claim 1, wherein
the key transformation rule is a rule for adding a prescribed value to the first key to transform the first key into the second key, and
when the target key is lower than the prescribed value, the key judging unit judges that the target key is the first key, and when the target key is equal to or higher than the prescribed value, the key judging unit judges that the target key is the second key.

5. The virtual computer system according to claim 1, wherein
when the key judging unit judges that the target key is the first key, the key judging unit notifies the virtual machine communication managing unit of a use request for the protected memory region, and when the key judging unit judges that the target key is the second key, the key judging unit notifies the hypervisor communication managing unit of a use request for the unprotected memory region.

6. The virtual computer system according to claim 1, wherein
the hypervisor further comprises a virtual machine managing unit that manages virtual machine management information indicating whether each virtual computer is the first virtual computer or the second virtual computer, and
the process judging unit judges whether a virtual computer executing the target process corresponds to the first virtual computer or the second virtual computer based on the virtual machine management information, judges that the target process is the protected process when the virtual computer executing the target process is judged to correspond to the first virtual computer, and judges that the target process is the unprotected process when the virtual computer executing the target process is judged to correspond to the second virtual computer.

7. The virtual computer system according to claim 1, wherein
the first virtual computer is a parent virtual computer, and
the second virtual computer is a child virtual computer generated by duplicating the parent virtual computer.

8. The virtual computer system according to claim 1, wherein
the second virtual computer is a parent virtual computer, and
the first virtual computer is a child virtual computer generated by duplicating the parent virtual computer.

9. The virtual computer system according to claim 1, wherein
the protected memory region is generated in a shared memory that is accessible only by the first virtual computer, and
the unprotected memory region is generated in a shared memory that is accessible by both first and second virtual computers.

10. A control method for a virtual computer system having a first virtual computer that executes a protected process, a second virtual computer that executes an unprotected process, and a hypervisor that controls the first and second virtual computers,
the control method comprising:
a step in which a key generating unit of the first virtual computer generates a second key that has been transformed from a first key according to a predetermined key transformation rule when a communication request is issued by the protected process that communicates with the unprotected process and a key generating unit of the second virtual computer generates the first key when a communication request is issued by another process;
a step in which a process judging unit of the first or second virtual computer judges whether a target process that is a process having issued the communication request is the protected process or the unprotected process;
a step in which a key judging unit of the first virtual computer judges whether a target key that is a key generated by the key generating unit is the first key or the second key when the process judging unit judges that the target process is the protected process;
a step in which a virtual machine communication managing unit of the first virtual computer notifies the target process of identification information of a protected memory region corresponding to the first key when the key judging unit judges that the target key is the first key;
a step in which a hypervisor communication managing unit of the hypervisor notifies the target process of a memory identification of an unprotected memory region corresponding to the second key when the key judging unit judges that the target key is the second key;
a step in which a key transforming unit of the second virtual computer transforms the target key from the first key to the second key based on the key transformation rule when the process judging unit of the second virtual computer judges that the target process is the unprotected process; and
a step in which the hypervisor communication managing unit notifies the target process of a memory identification of an unprotected memory region corresponding to the second key transformed by the key transforming unit.

11. A non-transitory computer-readable recording medium which stores a control program for a virtual computer system having a first virtual computer that executes a protected process, a second virtual computer that executes an unprotected process, and a hypervisor that controls the first and second virtual computers, wherein
the control program causes the first and second virtual computers to function as:
a key generating unit which generates a second key that has been transformed from a first key according to a predetermined key transformation rule when a communication request is issued by the protected process that communicates with the unprotected process and which generates the first key when a communication request is issued by another process;
a process judging unit which judges whether a target process that is a process having issued the communication request is the protected process or the unprotected process;
a key judging unit which judges whether a target key that is a key generated by the key generating unit is the first key or the second key when the process judging unit judges that the target process is the protected process; and
a virtual machine communication managing unit which notifies the target process of a memory identification of a protected memory region corresponding to the first key when the key judging unit judges that the target key is the first key, the control program causes the hypervisor to function as:

a hypervisor communication managing unit which notifies the target process of a memory identification of an unprotected memory region corresponding to the second key when the key judging unit judges that the target key is the second key, and the control program causes the first and second virtual computers to further function as:

a key transforming unit which transforms the target key from the first key to the second key based on the key transformation rule when the process judging unit judges that the target process is the unprotected process, and the hypervisor communication managing unit notifies the target process of memory identification of an unprotected memory region corresponding to the second key transformed by the key transforming unit.

12. An integrated circuit of a virtual computer system having a processor, a first virtual computer that executes a protected process using the processor, a second virtual computer that executes an unprotected process, and a hypervisor that controls the first and second virtual computers, wherein the first and second virtual computers comprise:

a key generating unit which generates a second key that has been transformed from a first key according to a predetermined key transformation rule when a communication request is issued by the protected process that communicates with the unprotected process and which generates the first key when a communication request is issued by another process;

a process judging unit which judges whether a target process that is a process having issued the communication request is the protected process or the unprotected process;

a key judging unit which judges whether a target key that is a key generated by the key generating unit is the first key or the second key when the process judging unit judges that the target process is the protected process; and a virtual machine communication managing unit which notifies the target process of a memory identification of a protected memory region corresponding to the first key when the key judging unit judges that the target key is the first key, the hypervisor comprises:

a hypervisor communication managing unit which notifies the target process of a memory identification of an unprotected memory region corresponding to the second key when the key judging unit judges that the target key is the second key, the first and second virtual computers further comprise:

a key transforming unit which transforms the target key from the first key to the second key based on the key transformation rule when the process judging unit judges that the target process is the unprotected process, and the hypervisor communication managing unit notifies the target process of a memory identification of an unprotected memory region corresponding to the second key transformed by the key transforming unit.

* * * * *